(12) United States Patent
Tawfik et al.

(10) Patent No.: US 7,205,062 B2
(45) Date of Patent: Apr. 17, 2007

(54) FUEL CELL STACK

(75) Inventors: Hazem Tawfik, Islip Terrace, NY (US); Yue Hung, Farmingdale, NY (US)

(73) Assignee: The Research Foundation of State University of New York, Albany, NY (US)

( * ) Notice: Subject to any disclaimer, the term of this patent is extended or adjusted under 35 U.S.C. 154(b) by 441 days.

(21) Appl. No.: 10/302,558

(22) Filed: Nov. 22, 2002

(65) Prior Publication Data

US 2004/0101736 A1 May 27, 2004

(51) Int. Cl.
*H01M 8/02* (2006.01)
*H01M 8/24* (2006.01)

(52) U.S. Cl. .............. 429/37; 429/32; 429/38
(58) Field of Classification Search ............ None
See application file for complete search history.

(56) References Cited

U.S. PATENT DOCUMENTS

| | | | |
|---|---|---|---|
| 4,826,741 A | 5/1989 | Aldhart et al. ............... 429/19 |
| 5,254,415 A | 10/1993 | Williams et al. ............ 429/153 |
| 5,547,777 A | 8/1996 | Richards .................. 429/32 |
| 5,616,431 A * | 4/1997 | Kusunoki et al. ............ 429/36 |
| 5,736,269 A * | 4/1998 | Okamoto et al. ............. 429/32 |
| 6,083,641 A | 7/2000 | LaConti et al. ............. 429/210 |
| 6,291,094 B1 * | 9/2001 | Yoshimura et al. ........... 429/34 |
| 6,372,372 B1 * | 4/2002 | D'Aleo et al. ............... 429/34 |
| 6,372,376 B1 | 4/2002 | Fronk et al. ................. 429/41 |
| 6,764,786 B2 * | 7/2004 | Morrow et al. ............... 429/37 |
| 6,794,076 B2 * | 9/2004 | Busenbender ................ 429/34 |
| 6,869,718 B2 * | 3/2005 | Yasuo et al. ................. 429/34 |
| 2002/0110722 A1 | 8/2002 | Yang ........................... 429/37 |
| 2003/0134180 A1 * | 7/2003 | Hori et al. .................... 429/44 |

FOREIGN PATENT DOCUMENTS

| | | |
|---|---|---|
| EP | 0936689 | 8/1999 |
| EP | 1094536 | 4/2001 |
| WO | 03/063264 | 7/2003 |

OTHER PUBLICATIONS

Patent Abstracts of Japan, vol. 2003, No. 9, Sep. 3, 2003 & JP 2003-151611, May 23, 2003.
Patent Abstracts of Japan, vol. 2002, No. 8, Aug. 5, 2002 & JP 2002-124291, Apr. 26, 2002.

* cited by examiner

*Primary Examiner*—Dah-Wei Yuan
*Assistant Examiner*—Karie O'Neill
(74) *Attorney, Agent, or Firm*—Dilworth & Barrese LLP

(57) ABSTRACT

A fuel cell pack includes multiple stacked membrane-electrode-assemblies and two base plates sandwiching the membrane-electrode assemblies and each configured to provide a uniform distribution of compressing forces across juxtaposed surfaces of the membrane-electrode-assemblies to eliminated external and internal gaseous leaks.

13 Claims, 6 Drawing Sheets

FUEL CELL STACK

BACKGROUND

1. Technical Field

The invention relates to a source of energy. In particular, the invention relates to a fuel cell configured to minimize the internal and external gas leakage of the reactant gases.

2. Background of Related Art

Due to an increasing demand on the earth's limited energy resources and to low conversion efficiencies of conventional power generation systems as well as environmental concerns, the need for a clean and reliable, alternative source of energy has greatly escalated. Fuel cells have been considered for power generation applications for years. Many innovative improvements in operational performance capability have been achieved. Efficiencies have been increased; water-management problems have been resolved; and the use of proton exchange membranes with reduction of the thin film catalyst layers has been achieved.

Fuel cell assemblies with proton exchange membrane cells, in which a hydrogen-oxygen reaction is employed for power generation, have become a popular source of energy in an automobile industry. Unfortunately, the development of suitable stacked assemblies using the proton exchange membrane fuel cell has been subject to various problems, mainly related to corrosion and leakage.

To obviate the corrosion problem, proton exchange membrane (PEM) fuel cells have been overwhelmingly manufactured with bipolar plates made from graphite, not metal. However, increased resistance to corrosion comes at a penalty of an increased porosity leading to an internal leakage through the graphite bipolar plates, and reduced structural integrity leading to an external leakage due to the inherent brittleness of graphite. In additional graphite bipolar plates have relatively low electrical conductivity leading to substantial energy losses, poor machinability and, thus are cost-inefficient.

To generate sufficient power for industrial use, a number of fuel cells have to be combined together in a series to increase the current proportionally to the electrode area. A major problem of the fuel cell stack is that the internal and external leakage of the reactant gases stem partially from the use of the brittle graphite plates that cannot withstand high pressure and partially from structural drawbacks of the known fuel cell stack structures.

In a typical structure of a fuel cell pack, forces generated during assembling the fuel cell stack are applied to peripheral regions of base plates flanking a plurality of stacked bipolar plates. Accordingly, when the assembly tie rods are tightened up, the base plates each are deformed and have an outwardly curved cross-section, resulting in the non-uniform distribution of the compressing forces creating passages that connect reactant gases together and can cause a leak or explosion. As a consequence, the deformed base plates do not apply sufficient compression forces to those regions of the bipolar plates that are traversed by gas-conveying conduits. Hence, the risk of external leakage is increased.

Furthermore, to simply apply greater forces is not practical because a) the forces would still be applied to the periphery, not to the inner regions of interest of the base plates, and b) greater forces can eventually crack graphite bipolar plates, which, as known, are brittle.

To increase the capacity of the fuel cell, it is necessary to have a great number of the stacked bipolar plates membranes and electrodes, which all have to be compressed to avoid the external and internal leakages, as discussed above. To accomplish this, opposite base plates have numerous circular holes traversed by tie rods, which, as a rule, have their heads provided with a circular cross-section. Accordingly, the application of a torque to the rod's head may be ineffective because the entire rod can simply keep rotating in response to the torque. Furthermore, guiding the tie rods through numerous holes can be an onerous job because of the substantial height of a fuel cell.

It is, therefore, desirable to optimize the design of fuel cell stack in a manner minimizing the risk of the internal and external leakage of the reactant gases and to provide a simple and reliable structure facilitating the assembly of the fuel cell stack.

SUMMARY OF THE INVENTION

This objective is attained by the inventive fuel cell stack configured so that compressing forces, generated during the assembly of the fuel cell stack, are applied to those regions of a plurality of stacked bipolar plates which are traversed by reacting gas conduits and manifolds.

In accordance with one aspect of the invention, the bipolar plates each have a multi-layered metallic structure capable of withstanding substantial loads and, thus, allowing application of higher pressure to the bipolar plates. Yet, this pressure should not be excessive to prevent irreparable deformation of the base plates as well as damaging the gaskets.

In accordance with another aspect of the invention, to minimize negative effects of deformation even further, spaced base plates, flanking multiple juxtaposed bipolar plates, are configured to resist deformation caused by application of the compressing forces. In particular, the base plates each have an elevated cascaded inner region effectively transforming the compressing forces, which are applied to the peripheral region of the base plates during the assembly of the pack, to inner regions of the bipolar plates traversed by the oxidant- and fuel-conveying manifolds.

In accordance with a further aspect of the invention, fittings providing flow communication between a fuel source and the oxidant and fuel-conveying manifolds are directly mounted to the bipolar end plates, not to the end plates, as typical for the prior art. This feature of the invention excludes flow communication between the base plates and the adjacent bipolar end plates. Hence, even if the base plates are somewhat deformed, the overall fuel-conveying structure is not affected because there is no flow communication between the base and end bipolar plates.

In accordance with still another aspect of the invention, assembly of the fuel stack is substantially facilitated due specifically configured tie-rod receiving channels formed in at least one of the base plates and cooperating with tie rods. In particular, the tie rods have polygonal tie rod heads fit in the tie-rod receiving channel configured with such as to facilitate the assembly of the fuel cell.

According to yet another aspect of the invention, a plurality of bipolar plates constituting the inventive fuel cell pack each have gas conveying channels or conduits provided with a multiplicity of projections bosses. The projections or bosses formed on each of the opposite sides of the bipolar plate along the gas conveying conduits channels obstruct the flow of a respective reactant gas redirecting it toward a membrane and thus enhancing the reaction between the gases.

OBJECTS OF THE INVENTION

Therefore, it is a principle object of the invention to minimize and eventually eliminate the internal and external leakages of the reactant gases of a fuel cell stack.

Another object of the invention is to provide a leak-free structure of the fuel cell stack that minimizes the deformation of opposite base plates.

A further object of the invention is to provide a structure of the fuel cell stack having an assembly providing for the easy guiding of a plurality of tie rods between opposite base plates and for the effective tightening of the same.

Still a further object of the invention is to enhance power density output of the fuel cell pack by introducing full or partial obstructions in the reacting gas flow conduits to increase interaction between the reactant gases through reactant electrode assemblies.

BRIEF DESCRIPTION OF THE DRAWINGS

The above and other objects, features and advantages will become more readily apparent from the specific description accompanied by the following drawings, in which.

SPECIFIC DESCRIPTION

Figures 1, 2, 3:
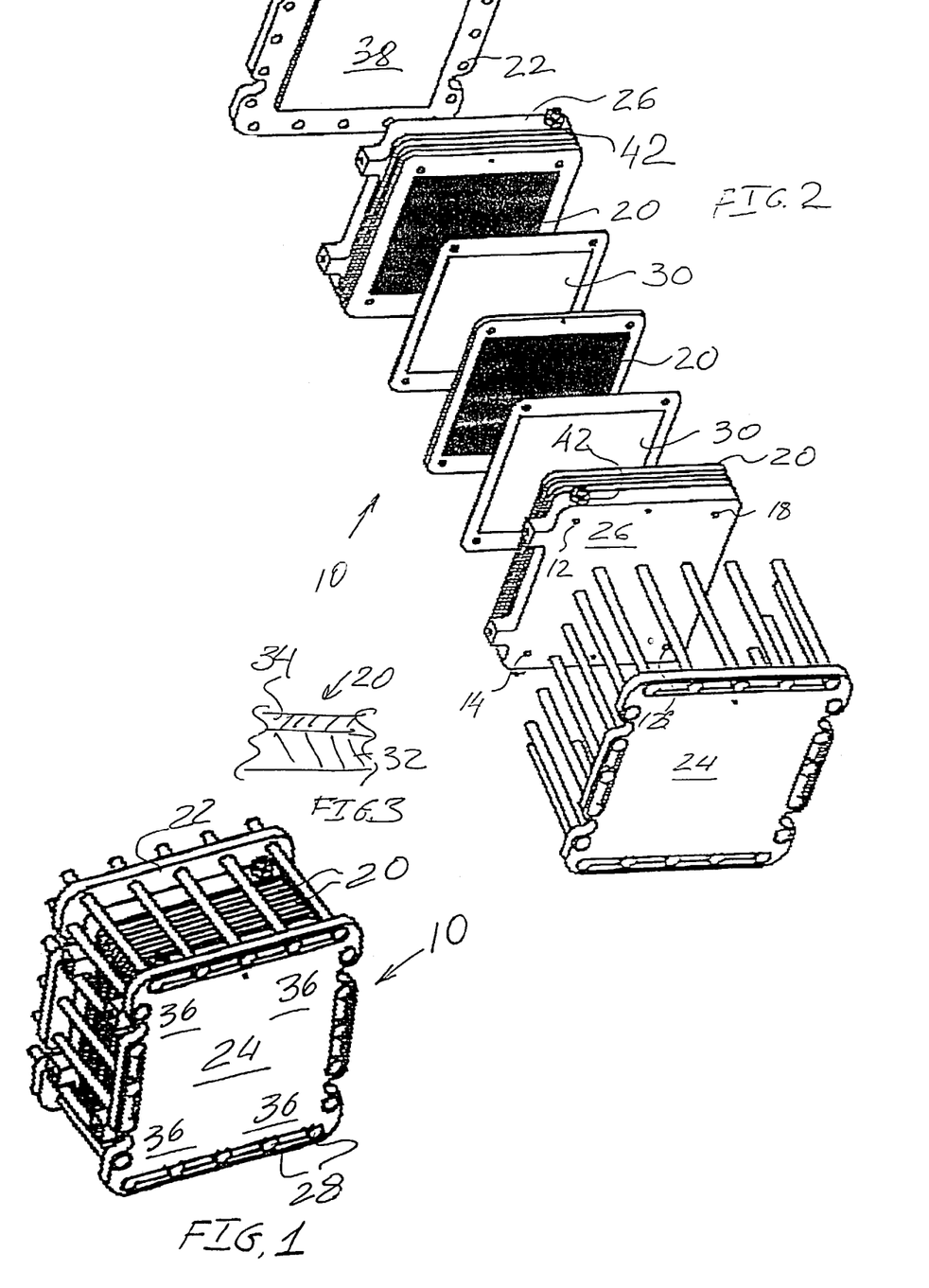
FIG. 1 is an isometric view of the inventive fuel cell.
FIG. 2 is an exploded view of the fuel cell stack shown in FIG. 1.
FIG. 3 is a cross-sectional view of the inventive bipolar plate.

An inventive fuel cell pack 10, as shown in FIGS. 1 and 2, is configured to minimize and eliminate leakage of the reactant gases ($H_2$ and $O_2$/air) between juxtaposed bipolar plates 20, 26 and between end bipolar plates 26 and base plates 22, 24. Primary external leakage-hazard regions of the fuel cell stack 10 are associated with inner manifolds 12, 14, 16 and 18 traversed reactant gases. In particular, a first pair of spaced inner manifolds 12, 14 are traversed by incoming and outgoing fuel, such as hydrogen, whereas another pair of inner manifolds are traversed by oxidant ($O_2$/air) entering an inlet manifold 16 and exiting, as water, through an outlet manifold 18. A further leakage-prone region of the fuel cell stack 10 includes an interface between base plates 22, 24 and end bipolar plates 26. Accordingly, the inventive structure of the fuel cell stack 10 is configured to at least minimize, if not to completely eliminate, the possibility of external and/or internal gaseous leaks in the above-identified regions.

The fuel cell stack 10 includes a plurality of repeat membrane-electrode-assemblies (MEA) each of which is assembled from a membrane 30 sandwiched by two electrodes (not shown) and by two bipolar plates 20. Base plates 22 and 24 tighten the pressure applied to the membrane-electrode assemblies upon applying a torque to the tie rods 28.

Each individual bipolar plate 20 (FIG. 3) has a structure, (disclosed in detail in a co-pending and commonly assigned application No.,), including a metal substrate 32, which is made preferably from aluminum or another low-resistance metal, and a metallic corrosion resistant layer 34. It was found particularly advantageous to prepare the corrosion resistant layer 34 from nickel- and carbon-based metallic powders deposited by a thermo-spray technique, including, but not limited to the high velocity oxygen fuel technology and detonation. However, even though metal-based bipolar plates 20 are particularly favored, the scope of the present invention does not exclude the use of graphite-based bipolar plates that can be particularly useful in highly acidic environment.

One of the structural advantages of using the metal bipolar plates 20, 26 stems from its excellent load-bearing characteristics. To reliably compress the bipolar plates together and, thus, to minimize and eliminate the external gas leakage between regions of juxtaposed bipolar plates 20 formed with inner manifolds 12–18 (FIG. 2), a torque should be applied to the tie rods 28. The higher the torque, the higher the pressure on the bipolar plates 20 and the gaskets located between the bipolar plates. However, these forces tend to deform the base plates 22, 24 so that each of the plates has an outwardly curved cross-section. Accordingly, the base plates' inner regions 36 (FIG. 1) move away from the end bipolar plates 26. In other words, deformation of the base plates 22, 24 causes non-uniform distribution of compressing forces imposed on the end bipolar plates 26. A particularly troubling consequence of the base plates' repeated deformation is an inadequate compression between juxtaposed bipolar plates as well as membranes and gaskets in the vicinity of the manifolds 12–18 leading to the external leakage of reactant gases.

Figure 4:
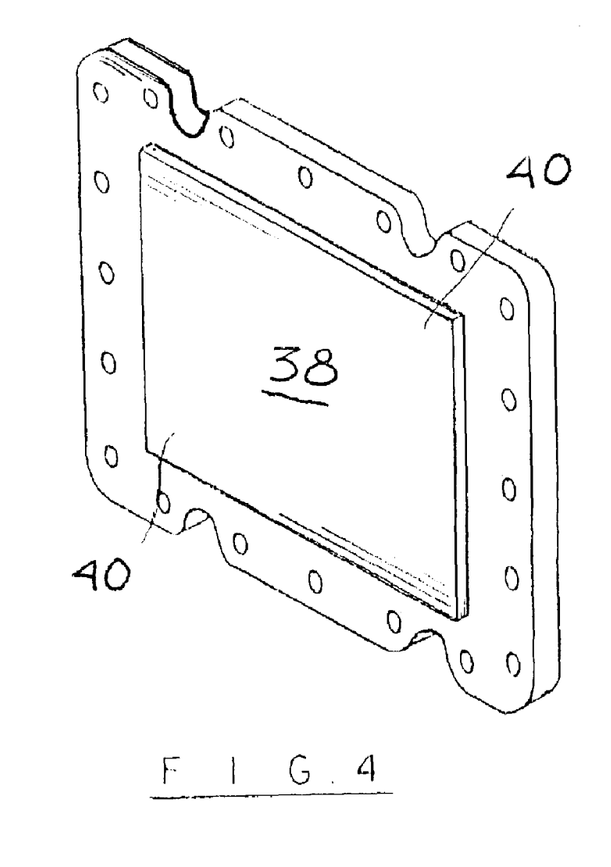
FIG. 4 is an outside isometric view of the base plate configured in accordance with the invention.

In accordance with one aspect of the invention, to minimize the external leakages, the base plates 22, 24 each have a raised central region 38 that can be cascaded in a step-wise fashion, as better seen in FIG. 2 and 4. To convert the torque applied to the tie rods 28 into compressing forces, which cause the inner regions 36 of the base plates 22, 24 to press against the regions with manifolds 12–18 of the bipolar plates 20, 26, corners 40 of the raised central region 38 are aligned with the manifolds. Thus, although the compression forces still tend to bend the base plates 22, 24, a stepwise structure of the latter resists this deformation and improves the transmission of compression forces from the base plates 22, 24 to the bipolar plates 26 and 20. Hence, the components of stacked MEAs reliably urge against one another minimizing the risk of the external and/or internal gas leakage.

While numerous shapes of the raised central region 38 are envisioned within the scope of the invention, invariably this region should be configured to have its corner regions 40 aligned with the manifolds 12–18.

Figure 6:
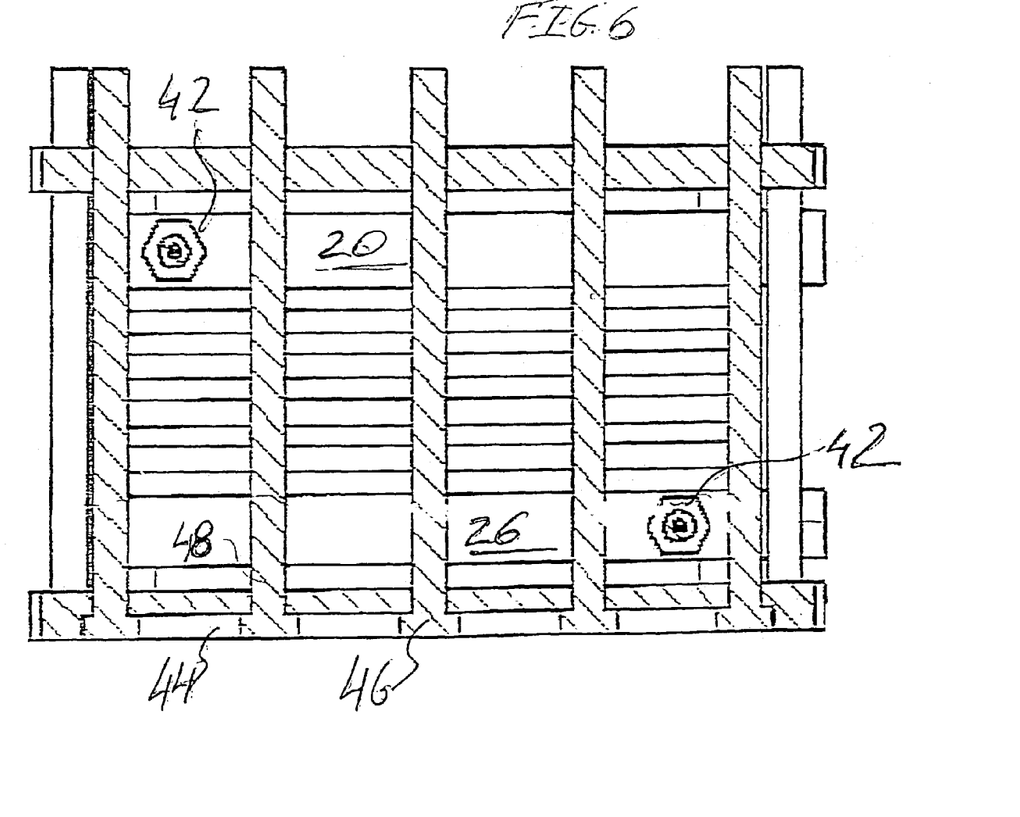
FIG. 6 is a cross-sectional view of the inventive fuel cell stack of FIG. 1.

According to another aspect, the fuel cell stack 10, as shown in FIGS. 2 and 6, includes four fittings 42 (only two are shown in FIG. 2), which are the connection between the reactant tank gas tanks (not shown) and the inner manifolds 12–18 of the fuel cell pack 10. Conventionally, the fittings 42 are located on the base plates; such a structure requires formation of additional manifolds in the base plates guiding gases through the manifolds 12–18 formed in the bipolar plates. In contrast, the invention provides for the fittings 42 to be directly mounted to the end bipolar plates 26. Hence, additional potentially leak-hazard regions between the base plates 22, 24 and the end bipolar plates 26 are eliminated. Note that if not for the metal end bipolar plates 26, such a structure would not be feasible, since the graphite-based plates would not have sufficient rigidity to support the mounted fittings.

Figure 5:
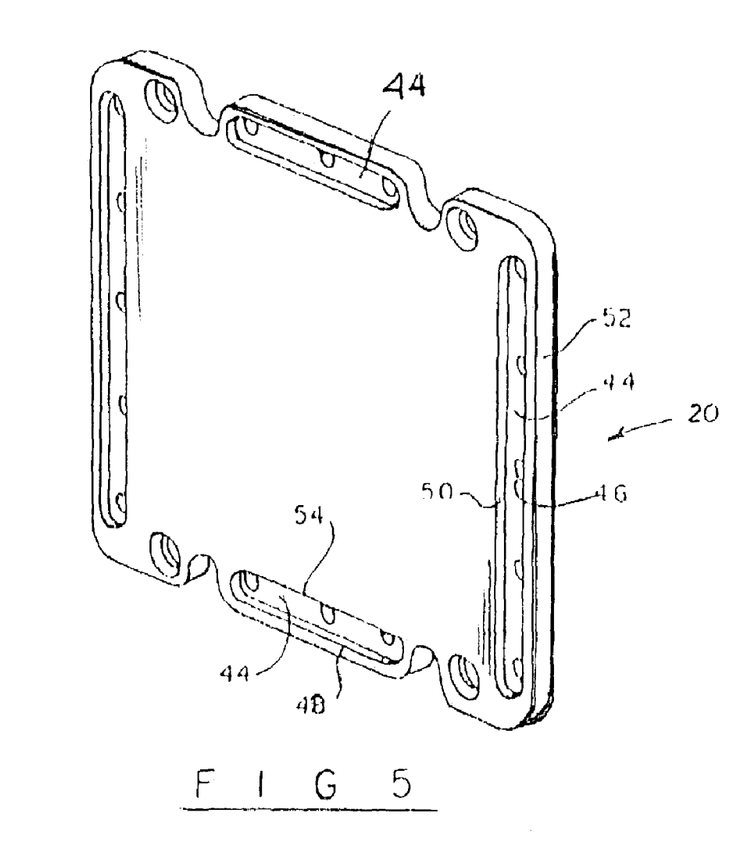
FIG. 5 is an inside isometric view of the base plates of FIG. 4.

Referring to FIGS. 2, 5 and 6, to facilitate the assembly of the fuel cell pack 10 having a plurality of stacked MEAs, one of base plates 24 (FIG. 5) has a plurality of peripheral channels 44 configured so that the width and depth of these channels 44 are sufficient to receive polygonal heads 46 (FIG. 2) of the tie rods 28. Advantageously, the channels 44 are configured to fully receive the polygonal heads 46, which, thus, do not project beyond the outer surface of the base plate 24, whereas the opposite sides 50, 52 (FIG. 5) of each channel 44 defining its width flank the polygonal heads 46 to prevent them from rotating in response to a torque applied to the opposite ends of the tie rods 28. To reliably guide the tie rods 28 between the base plates 24, 22, bottoms 54 of the channels 44 are machined with a plurality of holes 48 dimensioned to allow the tie rods to slide therethrough. As a consequence, during assembly of the fuel cell pack 10, the tie rods 28 are easily and reliably inserted through the base plates 22, 24. It is preferred to use corrosion resistant materials, such as stainless steel, for the inlet and outlet fittings 42 as well as for other fasteners securing the fuel cell pack tight.

Note that instead of four channels 44, as shown in the drawings, it is conceived to have either a single peripheral channel. Alternatively, a multiplicity of channels each dimensioned to correspond to the dimension of the individual polygonal head 46 is still another modification conceived within the scope of the invention.

In order to increase power density of the fuel cell pack 10, the polarities of adjacent fuel cells are combined together. The positive polarity of one cell combined with the negative polarity of the adjacent one forms the bipolar plate 20. The bipolar plate carries hydrogen, which is necessary for the negative polarity of the bipolar plate, and oxygen for its positive polarity. As known, water is a byproduct generated in the oxygen side of the bipolar plate 20. Improper water management or increased humidity will decrease the power output of the fuel cell, or it could eventually stop the electrochemical operation of the fuel cell because of possible water flooding or drying out of the membrane causing cracking.

Figure 8:
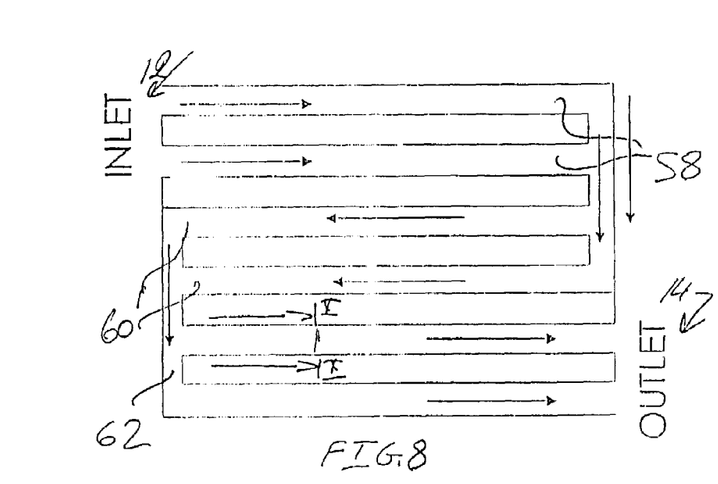
FIG. 8 is a schematic view of fuel conveying channels formed on one side of the bipolar plate of FIG. 7.
Figure 9:
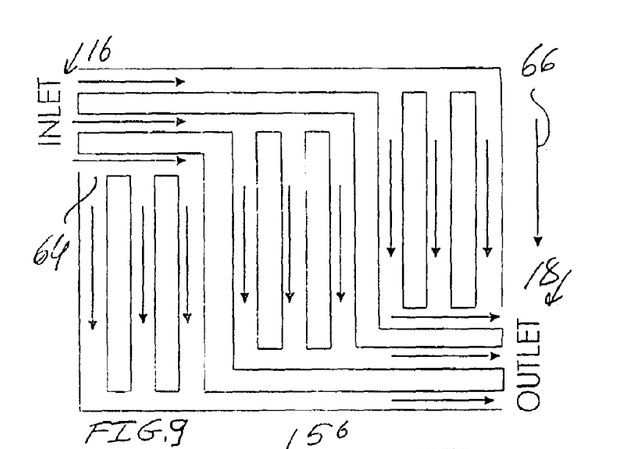
FIG. 9 is a schematic view of oxygen conveying channels on the opposite side of the bipolar plate of FIG. 7.

FIGS. 8 and 9 show one of possible designs of gas conveying channels formed in the bipolar plate for the hydrogen side and for the oxygen side, respectively. As shown in FIG. 8, inlet channels 58 are in flow communication with the manifold 12 (FIG. 2) and in flow communication with return channels 60 via a connecting channel 60. The channels are designed in horizontal zigzag configuration to prolong its dwelling in the conduits 12, 14 and give more opportunity for reaction with oxygen to take place. The serpentine area on the oxygen side (FIG. 9) is designed by pointing channels 64 communicating with the inlet manifold 16 downward such that water is drained by gravity, as indicated by an arrow 66, through the outlet manifold 18.

Figure 7:
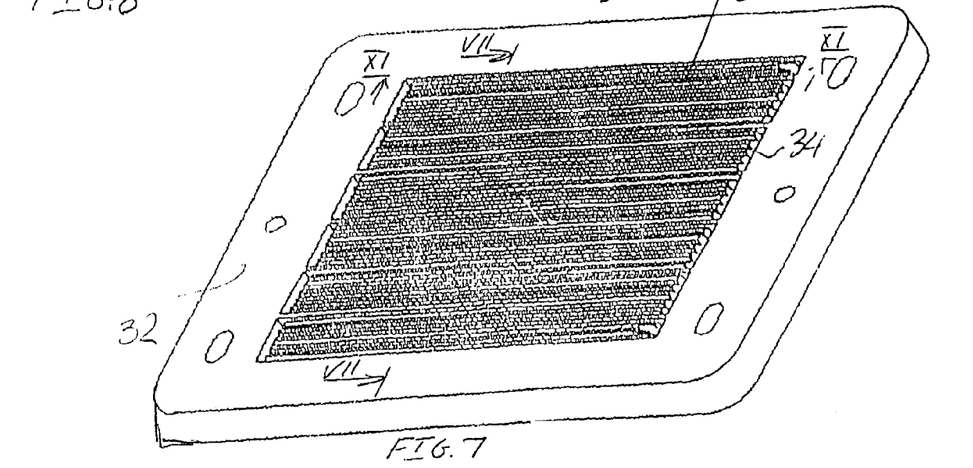
FIG. 7 is an isometric view of an individual bipolar plate.
Figure 10:
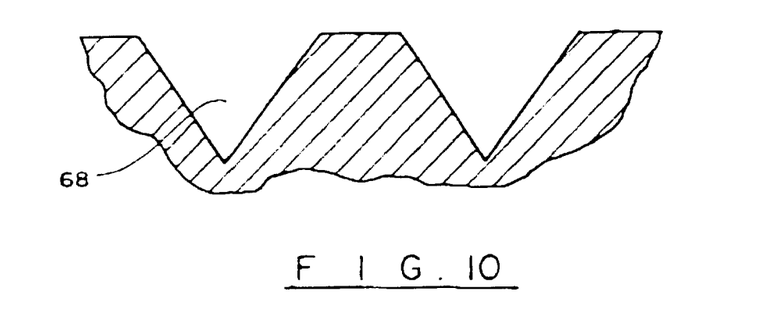
FIG. 10 is a cross-sectional view of the of the conveying channel taken along lines X—X of FIG. 9.
Figure 11:
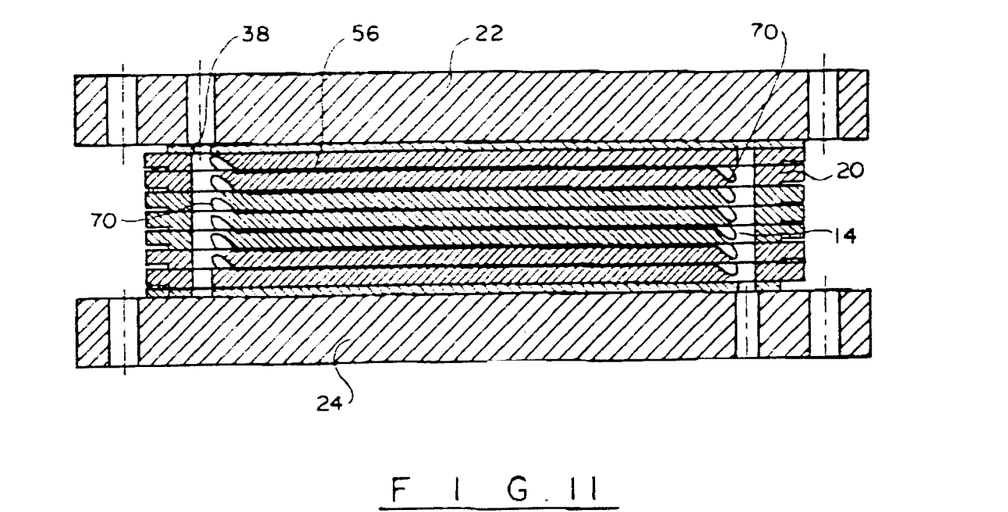
FIG. 11 is a sectional view of the bipolar plate of FIG. 7 taken along lines XI—XI.

To reliably bond the metal corrosion-resistant layer 34 (FIG. 7) on the metal substrate 34, the channels 58, 60, 62 and 64 each have a V-shaped cross-section 68, as shown in FIG. 10. A further improvement directed to minimizing the risk of gas leaks is illustrated in FIG. 11 and includes a plurality of slanted channels 70 providing flow communication between the manifolds 12–14 (16–18) and the gas conveying serpentine 56.

Figure 12:
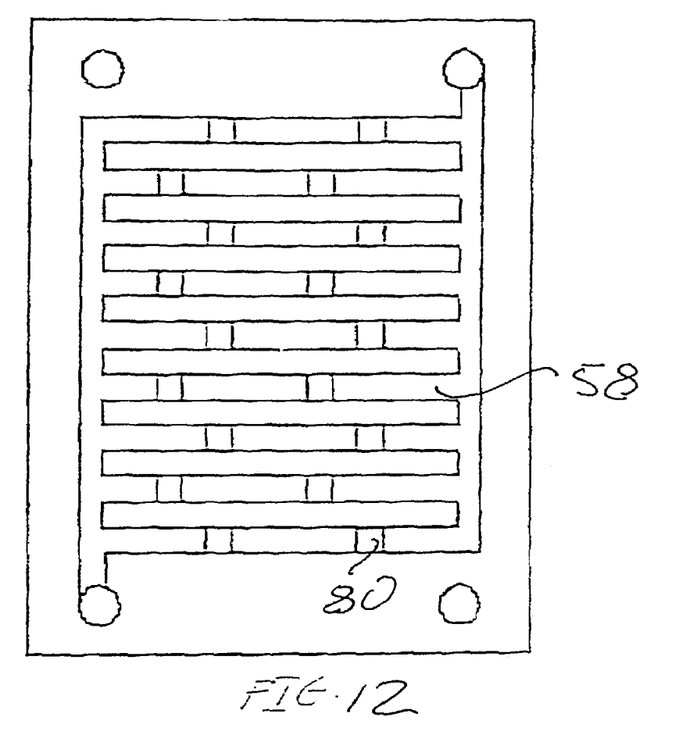
FIG. 12 is a top view of one of the opposite sides of the bipolar plate formed with full or partial projections obstructing flow of a respective reactant gas.
Figure 13:
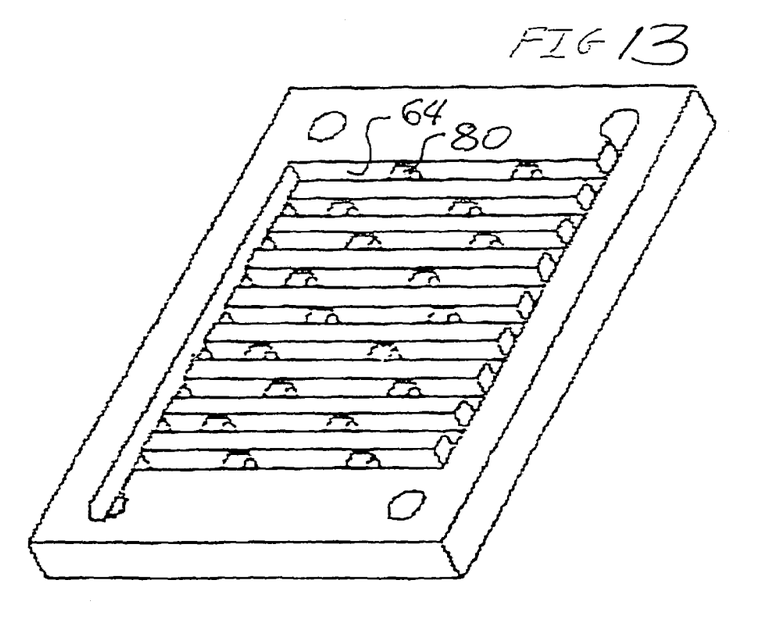
FIG. 13 is an isometric view of the bipolar plate shown in FIG. 12.

The backbone of the fuel cell is the membrane 30 juxtaposed with the bipolar plates 20 one side of which is located adjacent an oxygen/air conveying side of one of the bipolar plates, whereas the opposite side of the membrane 30 opposes the hydrogen side of the neighboring bipolar plate. The membrane provides for a gas permeable structure allowing the gases to react, as known in the art. To enhance this reaction, the gas conveying channels or conduits 58, 64 (FIGS. 8, 9) configured for conveying hydrogen and oxygen, respectively, have projections 80, as illustrated in FIGS. 12 and 13. Flow obstruction provided by the projections 80 redirect gas flow towards the membrane 30 (FIG. 2) and, thus, enhances the reaction of the reactant gases with the ambient air or electrolyte. A number and particular shape of the projections 80, which can be configured to fully or partially block the flow, are subject to given conditions. As a result of the projections 80, the power density output of the fuel cell pack is greatly improved due to the enhanced interaction between the reactant gases and reactant electrode assemblies.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A fuel cell pack comprising a plurality of stacked membrane-electrode-assemblies and two base plates sandwiching the membrane-electrode assemblies and each having a raised inner central region configured so that when compressing forces are applied to the base plates, each of the raised central regions presses uniformly against a respective membrane-electrode assembly to compress the stacked membrane-electrode assemblies, wherein one of the base plates has an outer side provided with at least one elongated peripheral channel which has a bottom terminating at a distance from an inner side of the one base plate and a plurality of holes opening into the inner side of the one base plate.

2. The fuel cell pack of claim 1, wherein each of the stacked membrane-electrode assemblies includes a membrane sandwiched between two bipolar plates, each of the bipolar plate being selected from a metal bipolar plate or a graphite and graphite composite bipolar plate first side and a second side, which is in contact with the raised central region.

3. The fuel cell pack of claim 2, wherein each of the bipolar plates has first and second inlet inner manifolds traversed by reactant gases and in flow communication with the first and second sides of the bipolar plate and third and fourth outlet inner manifolds spaced from and in flow communication with the first and second inner inlet manifolds for evacuating byproducts of the reaction of the reactant gases.

4. The fuel cell pack of claim 3, wherein the raised central region has a peripheral region aligned with the inner manifolds to uniformly distribute compressing forces across the bipolar plates.

5. The fuel cell pack of claim 4, wherein the raised central region and the bipolar plates are dimensioned substantially uniformly.

6. The fuel cell pack of claim 2, wherein the bipolar plates each have a metallic substrate and a metallic corrosion resistant layer bonded to the metallic substrate to minimize oxidation of the bipolar plates.

7. The fuel cell pack of claim 3, wherein each of the first and second sides of the bipolar plate is provided with a plurality of gas conveying channels having an upstream region in flow communication with the first and third inner manifolds, respectively, and a downstream region in flow communication with the second and forth inner manifolds.

8. The fuel cell pack of claim 7, wherein the channels each have a V cross-section.

9. The fuel cell pack of claim 7, wherein the upstream and downstream of each gas conveying channels have a respective slanted region extending from the inner manifolds at an angle differing from a right angle.

10. The fuel cell pack of claim 3, further comprising a plurality of fittings guiding the reactant gases to the inner first and third inlet manifolds and evacuating the byproducts of the reaction of the reactant gases from the inner second and fourth outlet manifolds traversing the plurality of the bipolar plates.

11. The fuel cell pack of claim 10, wherein one pair of the plurality of fittings are directly mounted to one of the two end bipolar plates and another pair of fitting are mounted to the other end bipolar plate, wherein the fitting of the one pair are inlet port fittings each in flow communication with a respective outlet port fitting of the other pair of fittings and spaced diagonally therefrom across the fuel cell pack.

12. The fuel cell pack of claim 1 further comprising a plurality of tie rods extending between the outer sides of the base plates and each having a polygonal head dimensioned to fit the channel and a stem extending through a respective pair of holes of the one and other base plates.

13. The fuel cell pack of claim 12, wherein the channel is shaped to prevent rotation of the polygonal heads upon applying a torque to opposite end of the tie rods, which extend beyond the outer side of the other base plate, and is sized to receive the polygonal heads so that the polygonal heads lie flush with the outer side of the one base plate.

* * * * *